Patented Apr. 17, 1945

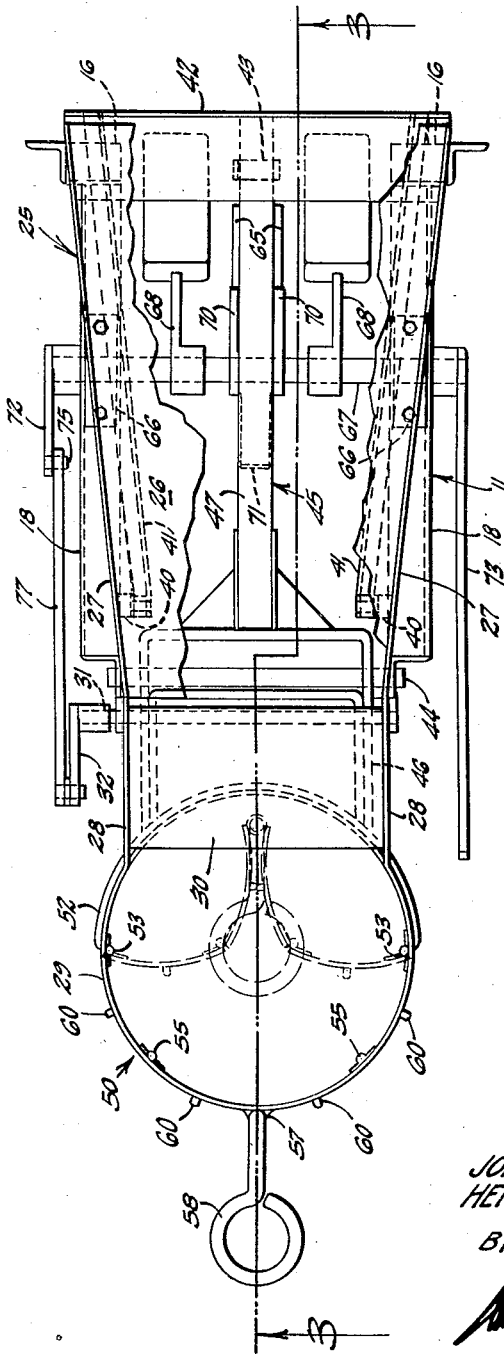

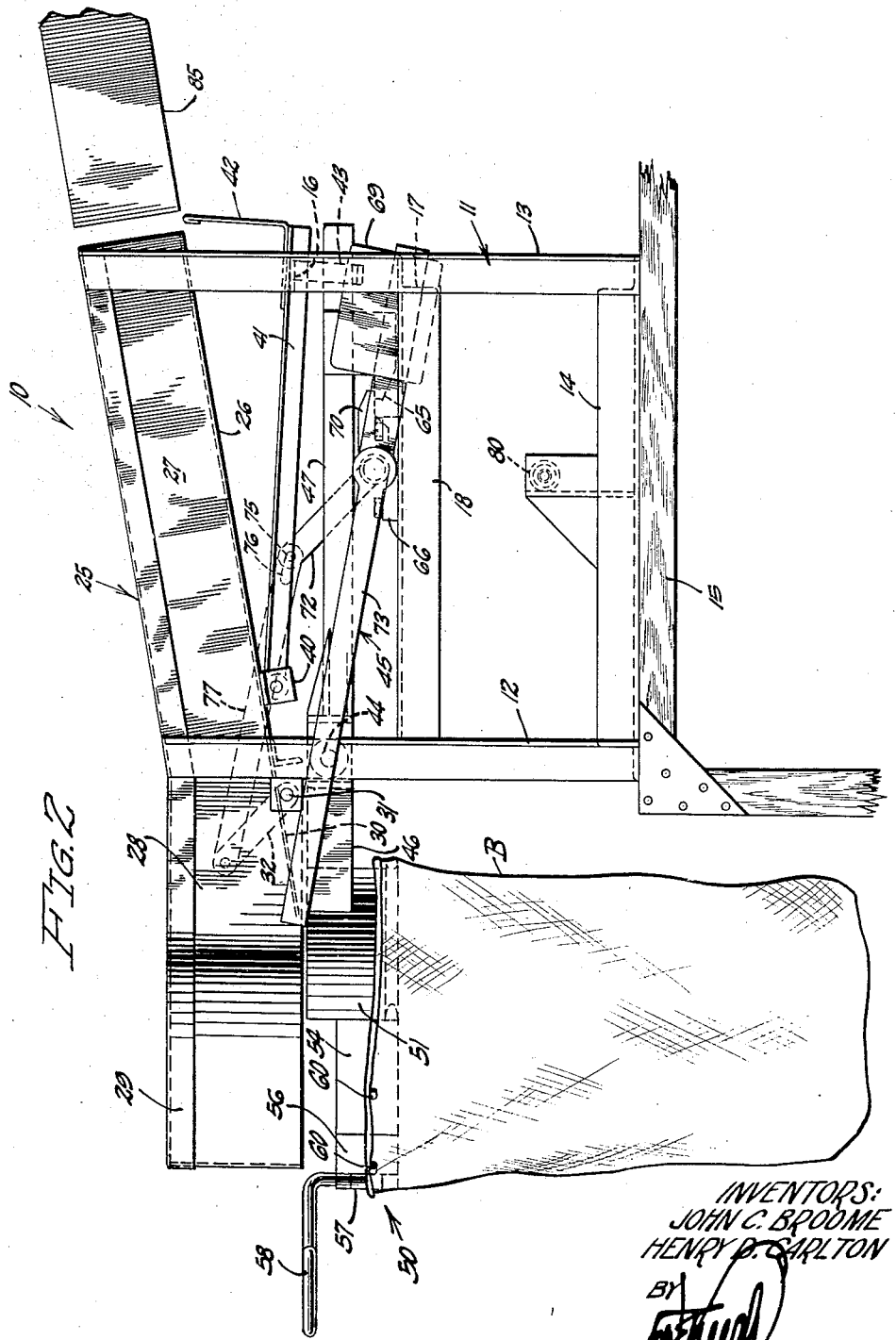

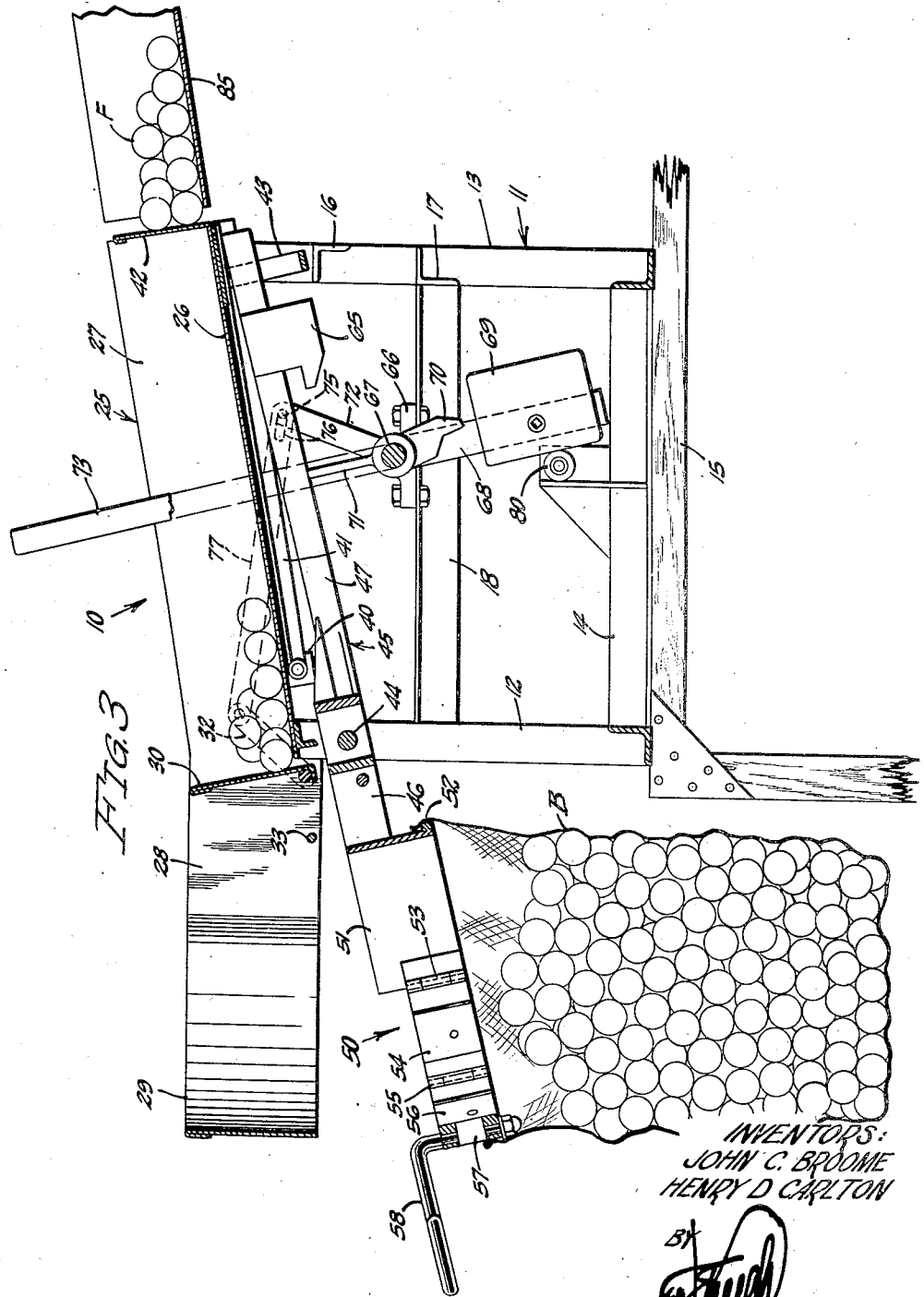

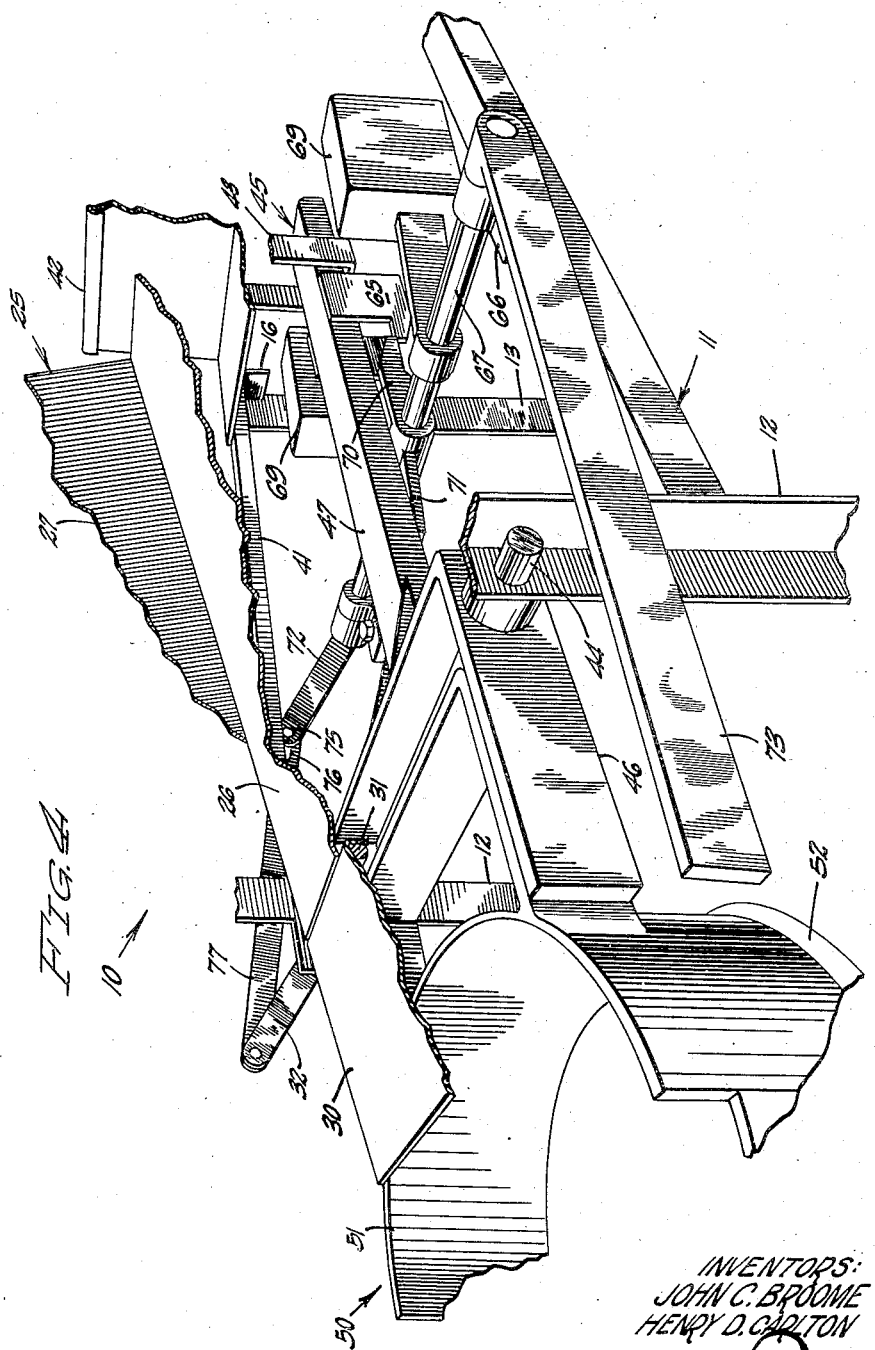

2,373,649

UNITED STATES PATENT OFFICE 2,373,649

FRUIT BAGGER AND WEIGHER

John C. Broome, Dunedin, and Henry D. Carlton, Highlands City, Fla., assignors to Food Machinery Corporation, San Jose, Calif., a corporation of Delaware Application July 5, 1943, Serial No. 493,604

7 Claims. (Cl. 249—58)

This invention relates to bagging and weighing devices and is especially useful in bagging rollable commodities such as citrus fruit.

It is an object of our invention to provide a relatively simple and inexpensive bagger and weigher.

It is another object of our invention to provide such a bagger and weigher which automatically delivers a predetermined weight of material into each bag.

The manner of accomplishing the foregoing objects, as well as further objects and advantages, will be made manifest in the following description taken in connection with the accompanying drawings, in which:

Fig. 1 is a plan view of a preferred embodiment of the invention partially broken away to illustrate hidden portions of the mechanism thereof.

Fig. 2 is a side elevational view of Fig. 1, and illustrates the beginning of a weighing operation.

Fig. 3 is a longitudinal sectional view taken on the line 3—3 in Fig. 1, and illustrates the conclusion of a weighing operation.

Fig. 4 is a fragmentary perspective detail view taken in the direction of the arrow 4 in Fig. 1, with the parts positioned as in Figs. 1 and 2.

Referring specifically to the drawings, the invention is shown therein as embodied in a bagger and weigher 10 including a frame 11, having corner posts 12 and 13 rising from a base 14 which preferably rests upon a table or bench 15.

The corner posts 13 have inwardly extending shoulders 16 and 17 formed by short pieces of angle iron welded thereto. The shoulders 17 are connected to the posts 12 by horizontal members 18. Mounted between and supported on upper ends of the posts 12 and 13 is a material chute 25 having an inclined floor 26 and side walls 27. The side walls 27 have extensions 28 which are connected by an arcuate wall 29. The wall extensions 28 are parallel and the space therebetween contains a gate 30 fixed on a shaft 31 which is pivotally mounted in the wall extensions 28 and has an arm 32 for actuating the gate 30 between a lower position as shown in Fig. 2 in which it constitutes a downward extension of the floor 26 and an upward position, in which it is shown in Fig. 3, in which it halts the discharge of material downwardly from this floor. Provided on side wall extensions 28 are pins 33 which support the gate 30 in its lowered position.

Pivotally mounted on brackets 40 provided on the bottom of the floor 26 are arms 41 of a second gate 42 disposed opposite the upper or receiving end of the chute 25. This gate is supported in its lowermost position by the arms 41 resting on the shoulders 16. The gate 42 has an eye 43 formed by a U-shaped band of metal extending downwardly therefrom.

Extending through upper ends of the posts 12 is a shaft 44 on which is pivotally mounted a balance beam 45 including a bifurcated bag-supporting arm 46 and a weighing arm 47, the latter extending lengthwise under the chute 25 so that the end of this arm is disposed within the eye 43 (see Fig. 3).

Provided upon the bag-supporting arm 46 is a bag holder 50 which may be of any suitable type but which is preferably collapsible as shown herein.

This bag holder comprises a semi-circular base section 51 which is rigidly secured to the bifurcated arm 46, this base section having a bead 52 provided about its lower outer edge. Connected by hinges 53 to the base section 51, are two collapsible sections 54 to which hinges 55 connect two similar sections 56 which are themselves united by a hinge 57 provided with an operating arm 58. The hinge 57 breaks inwardly and the hinges 53 and 55 break outwardly.

The sections 54 and 56 are provided with pins 60 which extend outwardly through the mesh of a bag when the latter is extended around the bag holder 50 and the bag holder is expanded by pulling on the handle 58 as shown in Figs. 1, 2 and 3. When it is desired to release a bag from the holder 50 and place a new bag thereon the operator merely pushes inwardly on the handle 58 which collapses the bag holder as shown in dotted lines in Fig. 1. The bags are then changed and the bag holder expanded so as to engage and support the second bag.

The weighing arm 47 has latch jaws 65 provided thereon.

Pivotally mounted in bearings 66 fixed on the frame members 18 is a shaft 67 carrying arms 68 having weights 69 adjustably mounted thereon. This shaft also carries latches 70, a stop 71, a lever arm 72 and a manual operating lever 73. The latches 70 are disposed opposite the jaws 65 so that when the manual lever 73 is depressed to swing the latches 70 upwardly, and the bag holder 50 is lifted to bring the jaws 65 beneath the latches 70 and the lever 73 then released the weight 69 swings the latches 70 downwardly against the jaws 65 and holds the balance beam 45 in the level position in which it is shown in Fig. 2. The bagger and weigher 10 is now in weighing position.

The upper end of the arm 72 has a pin 75 which extends into a slot 76 formed in one end of a link 77 the opposite end of which is pivotally connected to the gate control arm 32.

Mounted on the frame base 14 are suitable stop cushions 80, these being in alignment with the weights 69 so that the latter engage these stops when free to swing downwardly.

*Operation*

The bagger and weigher 10 is adapted to receive rollable objects such as citrus fruit in a stream which may be intermittent or continuous. Each bagging and weighing operation starts with the machine set for weighing as shown in Figs. 1 and 2. To accomplish this the bag holder 50 is first supplied with an empty bag B.

The handle 73 is now manually depressed from the position in which it is shown in Fig. 3 into the position in which it is shown in Fig. 2, so that the latches 70 extend upwardly somewhat from the shaft 67. While holding the handle 73 thus depressed, the bag holder handle 58 is manually lifted to lower latch jaws 65 beneath the latches 70 whereupon the handle 73 is released so that the weights 69 rotate the shaft 67 to bring the latches 70 downwardly on the latched jaws 65 as shown in Fig. 2, thereby holding the balance beam 45 in an approximately horizontal position. The rotation of the handle 73, as aforesaid, depresses the gate 30 to permit material in the chute 25 to gravitate thereover into the bag B. Until the balance beam 45 is rocked into horizontal position, however, the gate 42 extends upwardly to obstruct the delivery of more rollable material such as fruit F to the chute 25.

As shown in Figs. 2 and 3 any suitable means such as a delivery board 85 may be provided for delivering fruit to the upper or receiving end of the chute 25.

It is to be noted that while the gate 42 rides on the free end of the weighing arm 47 when the latter is inclined upwardly as shown in Fig. 3, this gate is supported by contact of the arms 41 with the shoulders 16 when the balance beam 45 is positioned as shown in Fig. 2. This permits the weighing arm 47 to be free, during the weighing operation, from engagement with the gate 42 or the eye 43 through which it extends.

The gates 30 and 42 both being disposed now in their lowered positions, material such as fruit F gravitates downwardly from the delivery board 85 onto the chute 25 and from this the fruit is delivered over the gate 30 into the bag B. It is to be noted that with the bag holder 50 in its upper position, as when the balance beam is in weighing position as shown in Fig. 2, the arcuate wall 29 overlies and is disposed close to the expanded circular rim of the bag holder 50 so as to cooperate therewith in retaining and directing into the bag all of the fruit rolling downwardly over the chute floor 26 and lowered gate 30.

The weights 69 are of such a size and they are so positioned on the arms 68 that when a predetermined weight of fruit F has been delivered to the bag B, the upward pressure of the jaws 65 against the latches 70 rocks the shaft 67 so as to disengage the jaws 65 from the latches 70. Immediately the weights 69 swing downwardly into contact with the stop cushions 80 and lift the gate 30 to halt delivery of any more fruit to this bag. The elevation of the weighing arm 47 in this operation brings this into engagement with the gate 42 and lifts the latter as shown in Fig. 3 to intercept the delivery of further fruit F from the delivery board 85 to the chute 25. Moreover, the balance beam 45 and the gate 42 are held, as positioned in Fig. 3, by the stop 71 engaging this arm, these parts continuing thus until the device is reset for accomplishing a new weighing operation. This is useful in preventing delivery of more fruit F to the chute 25 while the filled bag B is removed from the bag holder 50 as this removal lightens the bag arm 46 so that without the presence of the stop 71 as shown in Fig. 3, this arm would be overbalanced by the weighing arm 47 and the gate 42.

The filled bag having been removed from the holder 50 and a fresh empty bag applied to the latter, the same steps are followed as already described, in setting the bagger and weigher 10 for another bagging and weighing operation.

It is clear that the amount of material weighed into a bag B in a given bagging and weighing operation may be predetermined by selectively positioning the weights 69 on the arms 68.

We claim:

1. In a bagger and weigher the combination of: a frame; a balance beam pivotally supported at its fulcrum on said frame and having a bag arm extending in one direction therefrom and a weighing arm extending in the opposite direction therefrom; a bag holder on said bag arm for holding an open bag in position to receive material delivered downwardly thereinto; a weight; means for pivotally supporting said weight on said frame beneath said weighing arm; latch means on said pivotal means and on said weighing arm for applying said weight to the latter to hold the same downwardly until a given weight of material has been delivered into said bag, said latch means being releasable by the resulting rotation of said balance beam to permit said weight to swing downwardly about the axis of said pivotal means; means for delivering material to said bag; and means responsive to the downward swinging of said weight to halt the delivery of said material to said bag.

2. A combination as in claim 1, in which said pivotal means is provided with a lever which is adapted to be actuated to lift said weight and said balance beam is adapted to be rotated to depress said weighing arm to re-set the device for a new bag-filling operation.

3. In a bagger and weigher the combination of: a frame; a balance beam pivotally mounted at its fulcrum on said frame; said beam having a bag arm and a weighing arm; a bag holder on said bag arm; a material delivery chute mounted on said frame above said weighing arm and inclined downwardly toward the upper open end of said bag; a gate for controlling the delivery of rollable material from the lower end of said chute into said bag; weight means releasably associated with said weighing arm for weighing the material contained in said bag so that said weight means is released from engagement with said arm when a predetermined quantity of material has been delivered into said bag; and means connecting said weight means to said gate so that when said weight means is so released it actuates said gate to halt the delivery of material from said chute to said bag.

4. A combination as in claim 3 in which manual means is provided for re-setting said balance beam and said weight means and said gate for accomplishing another bag filling and weighing operation.

5. A combination as in claim 3 in which a second gate is disposed adjacent the upper end of said chute, said gate being controlled by said weighing arm and withdrawn downwardly into an inoperative position when the device is set for commencing a weighing operation, said second gate being extended upwardly with the elevation of said weighing arm incidental to the consummation of a bag-filling and weighing operation to halt further delivery of material to said chute.

6. A combination as in claim 3 in which a second gate is disposed adjacent the upper end of said chute, said gate being controlled by said weighing arm and withdrawn downwardly into an inoperative position when the device is set for commencing a weighing operation, said second gate being extended upwardly with the elevation of said weighing arm incidental to the consummation of a bag filling and weighing operation to halt further delivery of material to said chute; and means actuated by said weight means to retain said balance beam with the weighing arm in upward position during the removal of a filled bag from said bag holder and the placing of an empty bag on said bag holder.

7. In a bagger and weigher the combination of: a frame; a balance beam pivotally mounted at its fulcrum on said frame; said beam having a bag arm and a weighing arm; a bag holder on said bag arm; a weight; means for applying said weight to said weighing arm to weigh material in a bag suspended from said bag holder and to cause said weight to be released from said arm when a given weight of material has been delivered to said bag; means for delivering material to said bag; and gate means actuated by said weight when the latter is so released to halt the delivery of material to said bag.

JOHN C. BROOME.
HENRY D. CARLTON.